(12) United States Patent
Hegnauer et al.

(10) Patent No.: US 9,004,289 B2
(45) Date of Patent: Apr. 14, 2015

(54) FILTER DEVICE

(75) Inventors: Bruno Hegnauer, Gauting (DE); Gunnar Grim, Weichs (DE)

(73) Assignee: ANDRITZ KMPT GmbH, Vierkirchen (DE)

( * ) Notice: Subject to any disclaimer, the term of this patent is extended or adjusted under 35 U.S.C. 154(b) by 614 days.

(21) Appl. No.: 13/337,283

(22) Filed: Dec. 26, 2011

(65) Prior Publication Data

US 2012/0160761 A1 Jun. 28, 2012

(30) Foreign Application Priority Data

Dec. 27, 2010 (DE) .......................... 10 2010 061 560

(51) Int. Cl.
*B01D 33/09* (2006.01)
*B01D 33/00* (2006.01)
*B01D 33/067* (2006.01)
*B01D 33/46* (2006.01)

(52) U.S. Cl.
CPC ........ *B01D 33/0012* (2013.01); *B01D 33/0064* (2013.01); *B01D 33/0087* (2013.01); *B01D 33/067* (2013.01); *B01D 33/09* (2013.01); *B01D 33/466* (2013.01)

(58) Field of Classification Search
CPC .. B01D 33/067; B01D 33/09; B01D 33/0087; B01D 33/0064; B01D 33/466; B01D 33/0012
USPC ......................................... 210/398, 402, 232
See application file for complete search history.

(56) References Cited

U.S. PATENT DOCUMENTS

| 919,628 | A | | 4/1909 | Oliver |
| 1,223,245 | A | * | 4/1917 | Biesel ........................... 210/395 |
| 2,092,111 | A | | 9/1937 | Dons et al. |
| 2,362,300 | A | | 11/1944 | Nyman |
| 2,823,806 | A | * | 2/1958 | Harlan ........................... 210/387 |
| 3,061,477 | A | | 10/1962 | Lavallee |
| 3,096,280 | A | | 7/1963 | Davis et al. |

(Continued)

FOREIGN PATENT DOCUMENTS

| DE | 10005796 A1 | 8/2001 |
| EP | 0033371 A1 | 8/1981 |
| GB | 2361879 A | 11/2001 |

OTHER PUBLICATIONS

Deutsches Patent- und Markenamt, Office Action for German Application No. 10 2010 061 560.9, dated Nov. 15, 2011.

(Continued)

*Primary Examiner* — Fred Prince
(74) *Attorney, Agent, or Firm* — Cahn & Samuels, LLP

(57) ABSTRACT

In at least one embodiment, a filter device for filtering out of solid substance from a solid-liquid-mixture, including a bearing shaft extending along a rotation axis; a rotation body detachable from the bearing shaft and supported by the bearing shaft to be rotatable about the rotation axis; one or more filter cells formed on the rotation body and each includes a filter structure attached to the rotation body for filtering out the solid substance and allowing the liquid to pass from an inlet side to an outlet side, and a connection channel formed in the rotation body and that extends from the outlet side to an outlet opening which is formed on an axial side of the rotation body in a radial distance to the rotation axis; and a control device having a structural control unit for providing a connection between the respective outlet opening and a plurality of lines.

23 Claims, 13 Drawing Sheets

(56) References Cited

U.S. PATENT DOCUMENTS

| | | |
|---|---|---|
| 3,235,086 A | 2/1966 | Krynski |
| 3,630,380 A | 12/1971 | Barnebl et al. |
| 3,638,798 A | 2/1972 | Basfeld et al. |
| 4,695,381 A | 9/1987 | Ragnegard |
| 5,046,338 A | 9/1991 | Luthi |
| 5,683,582 A | 11/1997 | Luthi |
| 6,488,849 B2 * | 12/2002 | Bertolotti et al. .......... 210/360.1 |
| 2005/0077254 A1 | 4/2005 | Sawhill et al. |
| 2012/0160748 A1 | 6/2012 | Grim |

OTHER PUBLICATIONS

Espacenet, English abstract of DE 100 05 796 A1, Aug. 16, 2001.
KrassMaffei, Labordruckfilter.
Espacenet, English abstract EP0033371 (A1), 1981.

* cited by examiner

FILTER DEVICE

This patent application claims priority Germany patent application number DE 10 2010 061 560.9-27 filed on Dec. 27, 2010, which application is hereby incorporated by reference in its entirety.

I. FIELD OF THE INVENTION

The invention generally relates to a filter device, for example a filter device for use in the manufacture of pharmaceutical products.

II. BACKGROUND OF THE INVENTION

In the pharmaceutical industry the manufacturing process of medical products, including chemically based as well as biologically based medical products, often includes filtering out of the product, which is present in a suspension in form of solid substance.

Discontinuous/batch-wise filter processes are usually used, because of high standards regarding product quality as well as cleanness, the possibility for cleaning, and the possibility for inspection of the filter device(s), in the pharmaceutical industry. In this respect, however, there may be a disadvantage of a reduced productivity which results from a low ratio between productive phase to non-productive phase.

III. SUMMARY OF THE INVENTION

The invention in at least one embodiment provides a filter device, by which increased productivity can be achieved and which can comply with the high standards in the pharmaceutical industry regarding cleanness, the possibility for cleaning and the possibility for inspection of the filter device so that it is applicable for the manufacture of pharmaceutical products.

According to at least one embodiment of the invention, a filter device for filtering out a solid substance from a solid-liquid-mixture is provided where the filter device includes a bearing shaft which extends along a rotation axis and which may, e.g., includes a free end; a rotation body which is detachably attached to the bearing shaft, e.g. to the free end of the bearing shaft, and which is supported by the bearing shaft, e.g. supported by a bearing only on one side, so as to be rotatable about the rotation axis; one or more filter cells which are respectively formed on the rotation body, e.g. on the outer circumference of the rotation body, and which respectively has a filter structure which is attached to the rotation body, e.g. at the outer circumference of the rotation body, for filtering out the solid substance from the solid-liquid-mixture, allowing the liquid of the solid-liquid mixture to pass therethrough from a filter structure inlet side to a filter structure outlet side, and a connection channel which is formed within the rotation body and which extends from the filter structure outlet side to an outlet opening which is formed at an axial side (seen in direction of the rotation axis), e.g. facing the bearing shaft, of the rotation body in a radial distance to the rotation axis, a control device which includes a (mechanical) structural control unit for providing a connection between the respective outlet opening and a plurality of (branch-off) lines in a controlled manner. The structural control unit in at least one embodiment includes a sealing disc provided to be co-rotatable with the rotational body and in which, corresponding to the respective outlet opening, a respective through opening is respectively formed, and a stationary control disc which is in a (fluidly sealed) rotational engagement (fluidly sealed slide rotation contact) and in which control openings are formed, which are connected to a respective (branch-off) line and which, in dependence on the rotation position of the rotation body, are connected with the respective through opening of the sealing disc in order to connect (in a controlled manner, e.g. selectively) the filter structure outlet side of the respective filter cell with the respective (branch-off) line in dependence on the rotation position of the rotation body. In at least one embodiment, the filter device includes housing, e.g. a sealed and/or fluidly sealed housing, which has a housing interior (completely) accommodating the rotation body, wherein the structural control unit is (completely) arranged within the housing between (axially and completely between) a housing wall, which axially (with respect to the rotation axis) defines the housing interior (accommodating the rotation body) and which extends transversely to the rotation axis, and the rotation body.

In at least one embodiment, the detachability, from the bearing shaft, of the rotation body, e.g. in connection with the single-side bearing of rotation body, allows for an easy access for cleaning and inspecting in case of a product change. Further, the structural control unit, which together with the rotation body is accommodated in the same housing interior, is also accessible in correspondingly quick manner in order to, for example, be inspected, maintained or, in case of being detachable, interchanged.

The control device in at least one embodiment includes either a pressure control device or a pressure control device by which a pressure difference between the filter structure outlet side and the filter structure inlet side of the respective filter cell can be controlled and/or adjusted, for example, varied, (from the filter structure outlet side) in dependence on the rotation position of the rotation body. To this end, for example, a mechanical control and/or adjustment of the pressure difference may be included in the structural control unit from the filter structure outlet side, by, e.g., having provided, e.g. permanently provided, the respective line with an under pressure/over pressure respectively assigned thereto. Thereby, the filter function for achieving a desired filter result can be further adjustable (will be discussed further below). From this disclosure, it is to be understood that—with respect to said pressure difference—by solid substance depositing on/adhering to the filter structure, the filter structure inlet side can be shifted and/or is shifted from a position directly at the outside of the filter structure to a position at the outside of the solid substance/filter cake adhering to the filter structure.

In at least one embodiment, fluid which is present in the connection channel can be individually discharged via the diverse lines in a controlled manner. Thereby, different fluids/liquids such as, for example, liquid separated from the mixture, washing liquid, wet gas/wet air generated when the filter cake dries which are present in dependence on the rotation position may be discharged via different lines correspondingly assigned to said different fluids (will also be discussed below in further detail).

The control disc and the sealing disc in at least one embodiment are, e.g., provided to be detachable from each other so that, e.g., the control disc may be interchangeable in order to provide respective other pressure controls assigned to the respective control disc in order to, e.g., thereby correspondingly adjust the filter function. The sealing disc in at least one embodiment is interchangeable.

The structural control unit in at least one embodiment is, e.g., arranged between the bearing, which is provided and/or arranged on only one side of the rotation body, and the rotation body. Thereby, after dismounting the rotation body, the structural control unit in at least one embodiment is immediately accessible for being cleaned, inspected, etc. as well as for, if necessary, for being interchanged. The bearing shaft is, e.g., supported by means of the bearing only on one side and includes a free end, to which the rotation body is attached. An auxiliary bearing in at least one embodiment is provided on the opposite side of the bearing shaft, by which the rotation body is additionally supported. The structural control unit may then, e.g., be disposed between the bearing, arranged on the side of the bearing shaft, and the rotation body. The auxiliary bearing may, e.g., be arranged on a housing lid, by which a housing opening, which faces away from the bearing shaft and through which, e.g., the rotation body can be removed from the housing, can be closed.

In at least one embodiment, the control openings in the control disc of the (mechanical) structural control unit of the control device act as valves, by means of which the corresponding plurality of (branch-off) lines can be and/or are connected with the (respective) connection channel in the rotation body in dependence on the rotation position of the rotation body in a controlled manner, e.g. selectively, wherein the (respective) connection channel can be provided via the respective (branch-off) line with an over pressure or an under pressure respectively assigned to said line. The control device (e.g. if provided as a pressure control device) may include, in addition to the structural control unit, a pressure control valve (or a plurality of control valves), by means of which the pressure in the respective line can be varied, for example in dependence on the rotation position of the rotation body, and thereby the pressure difference between the filter structure inlet side and the filter structure outlet side can be varied from the filter structure outlet side.

Because of the adjustability or, e.g., variability, of the pressure difference between the filter structure inlet side and the filter structure outlet side, which in at least one embodiment may be provided by means of the (mechanical) structural control unit (by, e.g., having provided, e.g. permanently provided, the lines with different (under-)pressure), the pressure difference between the filter structure inlet side and the filter structure outlet side can be manipulated in dependence on the rotation position of the rotation body in any controlled manner in order to thereby further optimize the filtering result, e.g. with regard to a product quality required by the pharmaceutical industry. Controlling (or varying) the pressure difference from the filter structure outlet side allows a selective provision of the (respective) filter cell with an under pressure/over pressure. The pressure adjustment and/or pressure control in at least one embodiment may also be such that the same pressure is present in each line so that the pressure difference between the filter structure inlet side and the filter structure outlet side is permanently kept substantially constant during operation. The respective channel section constituted by connection channel and (branch-off) line, and the respective filter cell can be easily cleaned and inspected in at least one embodiment.

In at least one embodiment, the control device (for example, if provided as pressure control device) may additionally be provided such that it can vary the pressure on the filter structure inlet side. To this end, the rotation body may, e.g., be accommodated in a sealed housing (that is, in a sealed housing interior of the housing), the housing interior of which can be provided with an over pressure and/or under pressure by means of a pressure air pump and/or a suction pump.

As mentioned above in at least one embodiment, the use of the structural control unit with the lines provided thereon, which are assigned to respective control openings, allows the discharge of different fluids/liquids (e.g. liquid separated from the solid-liquid mixture by the filtering process, washing liquid and/or wet gas/wet air generated when the solid substance, adhering on the filter cell, dries) via the different (branch-off) lines which are respectively assigned to the control openings and which are departing from the structural control unit and/or to the control disc thereof. A high over pressure may also be applied to the filter structure outlet side of the filter cell via such a (branch-off) line in order to facilitate removing solid substance from the rotation body when discharging solid substance. By the continuous rotatability of and/or by continuously rotating the rotation body an increased productivity can be achieved. The optionally provided one-side and/or cantilever bearing of the rotation body reduces the size of the device and dead space for dirt accumulation, wherein the rotation body is easily accessible for cleaning purposes.

As discussed above in at least one embodiment, e.g., an over pressure/under pressure, which is assigned to the respective line, may be present in the respective (branch-off) line so that the respective connection channel, when the outlet opening/through opening assigned thereto runs over the control opening assigned to the respective line, is provided with the over pressure/under pressure provided, e.g. permanently provided, in the line (branch-off line). Further, different functions (such as mixture-liquid discharge, pressure air supply, wet gas discharge, washing liquid discharge) may be assigned to the respective line in dependence on the rotation position of the rotation body.

The filter structure in different embodiments may be interchangeably or non-interchangeably attached to the rotation body. In case of interchangeability, the filter structure in at least one embodiment may be interchanged when interchanging the product/mixture to be filtered, wherein the rotation body may be cleaned, if necessary. In case of non-interchangeability, the rotation body in at least one embodiment may be provided as one-way-filter-rotation body which may be interchanged as whole in case of an interchange of the product/mixture to be filtered.

The filter structure in at least one embodiment may be a filter cloth/screen cloth which (at the location of the respective filter cell) is attached, e.g. stretched, to the outer circumference of the rotation body, or it may also be a solid body screen, for example made of metal or a firm plastic. The filter structure may, e.g., be supported by a perforated support plate, e.g. a metal or plastic plate. The filter structure may be interchangeably or non-interchangeably attached to the rotation body.

The rotation body may have any geometrical shape. For example, it may be formed in the shape of a cylinder drum (e.g., a circular cylinder drum) or in the shape of a (circular) cylinder drum segment, wherein in case of a cylindrically shaped or cylinder segment shaped formation of the rotation body the (longitudinal) cylinder axis may, e.g., be arranged co-axially to the rotation axis. The rotation body may also be formed as a cuboid or as a prism or as a torus, etc. The rotation axis extends substantially horizontally, wherein the rotation axis may also be provided to extend at an inclined angle of less than 90° to the horizontal.

According to at least one embodiment, the bearing shaft has a free end, wherein the rotation body is attached to the free end of the bearing shaft and is supported only on one side by means of a bearing.

The rotation body in at least one embodiment may, e.g., be attached to the bearing shaft in a non-rotatable manner, that is, it may be co-rotatable with the bearing shaft. The bearing shaft thereby forms a rotary shaft. In this embodiment, no dirt generating rotation bearing parts are present in the area of the rotation body. The rotation body can then be accommodated within a housing in a more dirt protected manner, and the bearing may be arranged outside of the housing/housing portion accommodating the rotation body and/or outside of that said housing interior within which the rotation body is accommodated. However, the rotation body may also be supported on the bearing shaft in a rotatable manner. The bearing shaft and/or rotary shaft may, e.g., be provided as a hollow shaft and/or hollow rotary shaft, wherein the inner space longitudinally extending through the hollow shaft/hollow rotary shaft may serve the accommodation of the (branch-off) lines.

In at least one embodiment, the rotation position of the rotation body may, e.g., additionally be detected mechanically by a control cam disc, which control cam disc, e.g., includes control cams which are mechanically connected (e.g., via cam followers/push rods) to, e.g., (additional) pressure control devices, (such as, e.g., opening/closing valves provided in the (branch-off) lines for (additionally) opening and/or closing the lines), of the control device, or which are mechanically connected with, e.g., washing devices (such as, e.g., washing nozzles) in order to operate these washing devices in dependence on the rotation position of the rotation body in a controlled manner. The control device in at least one embodiment may (additionally) include, e.g., a sensor generating an electrical rotation position signal (e.g., an optical sensor (e.g., an LED-sensor) or a magnet sensor or a capacitor sensor) for detecting the rotation position of the rotation body, and an electronic control unit connected to the sensor and, e.g., to the (additional) pressure control devices as above described or to the washing device or the like devices, by which electronic control unit the pressure control devices and/or washing devices and/or other devices may be controlled in dependence on the rotation position, detected by the sensor, of the rotation body. In case of the use of such a sensor, a possible mechanical signal feedback connection between the pressure control devices or the like devices and the position of the rotation body may be replaced by a corresponding configuration/programming of the electronic control unit. The electronic control unit itself can be varied and, hence, adapted to diverse products/product requirements in an easy manner.

The housing of the filter device is, e.g., a sealed (fluidly sealed) housing (that means, it is a housing with a sealed housing interior). The structural control unit is arranged within the housing, e.g., is arranged between the housing wall, which extends transversely to the rotation axis and is arranged on the side (with respect to the rotation body) of the bearing shaft and/or of the bearing, and the rotation body. The housing wall in at least one embodiment is, e.g., a housing wall which defines/limits the housing interior on the side of the bearing shaft and/or the (only one-side) bearing and, hence, is, e.g., a front end wall of the housing with respect to the definition of the housing interior accommodating the rotation body.

The sealing disc in at least one embodiment may be materially formed with the rotation body in one piece. The sealing disc in an alternative embodiment may also be a part separate from the rotation body. In further examples, the sealing disc is permanently fixedly attached or detachably mounted to the rotation body, for example, by means of the bearing shaft. The stationary control disc may be materially formed with the housing in one piece or may be formed as a part separate from the housing and, e.g., may be formed as an interchangeable part.

In at least one embodiment, the rotation body and the sealing disc are detachably attached to the bearing shaft such that when dismounting the rotation body from the bearing shaft the sealing disc will automatically be separated from the control disc and is dismountable from the bearing shaft together with the rotation body.

The respective filter cell in at least one embodiment includes, e.g., first and second connection channels formed in the rotation body, which respectively extend from the filter structure outlet side to a first outlet opening and a second outlet opening (which is different from the first one), respectively, which are formed on an axial side, facing the bearing shaft and/or the bearing, of the rotation body in a radial distance to the rotation axis, wherein the (respective) first and the (respective) second outlet opening are arranged in a radial distance to each other with respect to the rotation axis such that they do not overlap each other in radial direction. In case of a plurality of filter cells with correspondingly a plurality of first and second outlet openings, the first outlet openings are located on a first circle co-axial with the rotation axis and the second outlet openings are located on a second circle, different from the first circle, co-axial (concentric) with the rotation axis.

The filter device according to any one of the previously described embodiments may, e.g., further includes a sealed housing (in the above aspect with sealed housing the latter may, e.g., have the following additional features), in which the rotation body is accommodated, wherein the housing has a housing opening, closed by a dismountable housing lid, on an axial side facing away from the bearing shaft, through which the rotation body can be removed from the housing in axial direction of the rotation axis.

In the filter device according to any one of the previously described embodiments, the respective filter cell may, e.g., include a filter pocket on the side of the filter structure outlet side, which is formed in the rotation body, e.g. in the outer circumference of the rotation body, and which tapers towards the corresponding connection channel.

In the filter device according to any one of the previously described embodiments, the connection channel of the respective filter cell, may, e.g., include a first channel portion which extends perpendicularly to the rotation axis from the filter structure outlet side, and a second channel portion which extends parallel to the rotation axis from the first channel portion to the outlet opening, or the connection channel of the respective filter cell may, e.g., extend from the filter structure outlet side to its outlet opening in an angle to both the rotation axis and the perpendicular thereof. In case of a plurality of connection channels within the rotation body the one and/or the other type of connection channels (as, for example, described above) may be formed in the same rotation body.

In the filter device according to any one of the above described embodiments/aspects, the bearing shaft may, e.g., be provided as a rotatably driven rotary shaft, with which the rotation body is coupled in a non-rotatable manner. That is, the bearing shaft and the rotation body are commonly supported in a rotatable manner and rotate together about the rotation axis.

In the filter device according to any one of the above described embodiments/aspects, the rotation body may, e.g., be coupled to the end of the bearing shaft by means of a quick fastener plug-in coupling (e.g. a bayonet-fastener or a snap-fit connection) or by means of a quick fastener screw coupling (e.g., a dairy coupling).

The supply of the liquid-solid-mixture to be filtered in at least one embodiment may be provided, e.g., in a continuous manner via a mixture supply connection provided on a and/or the housing, within which the rotation body is accommodated.

In the following, the invention will be further discussed in further detail on the basis of embodiments with reference to the drawings.

IV. BRIEF DESCRIPTION OF THE DRAWINGS

In the drawings, like reference characters generally refer to the same parts throughout the difference vies. The drawings are not necessarily to scale, emphasis instead generally being placed upon illustrating the principles of the invention. In the following description, various embodiments of the invention are described with reference to the following drawings. The use of cross-hatching and shading within the drawings is not intended as limiting the type of materials that may be used to manufacture the invention.

V. DETAILED DESCRIPTION OF THE INVENTION

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, logical, and electrical changes may be made without departing from the scope of the invention. The various embodiments are not necessarily mutually exclusive, as some embodiments can be combined with one or more other embodiments to form new embodiments.

Figure 1:
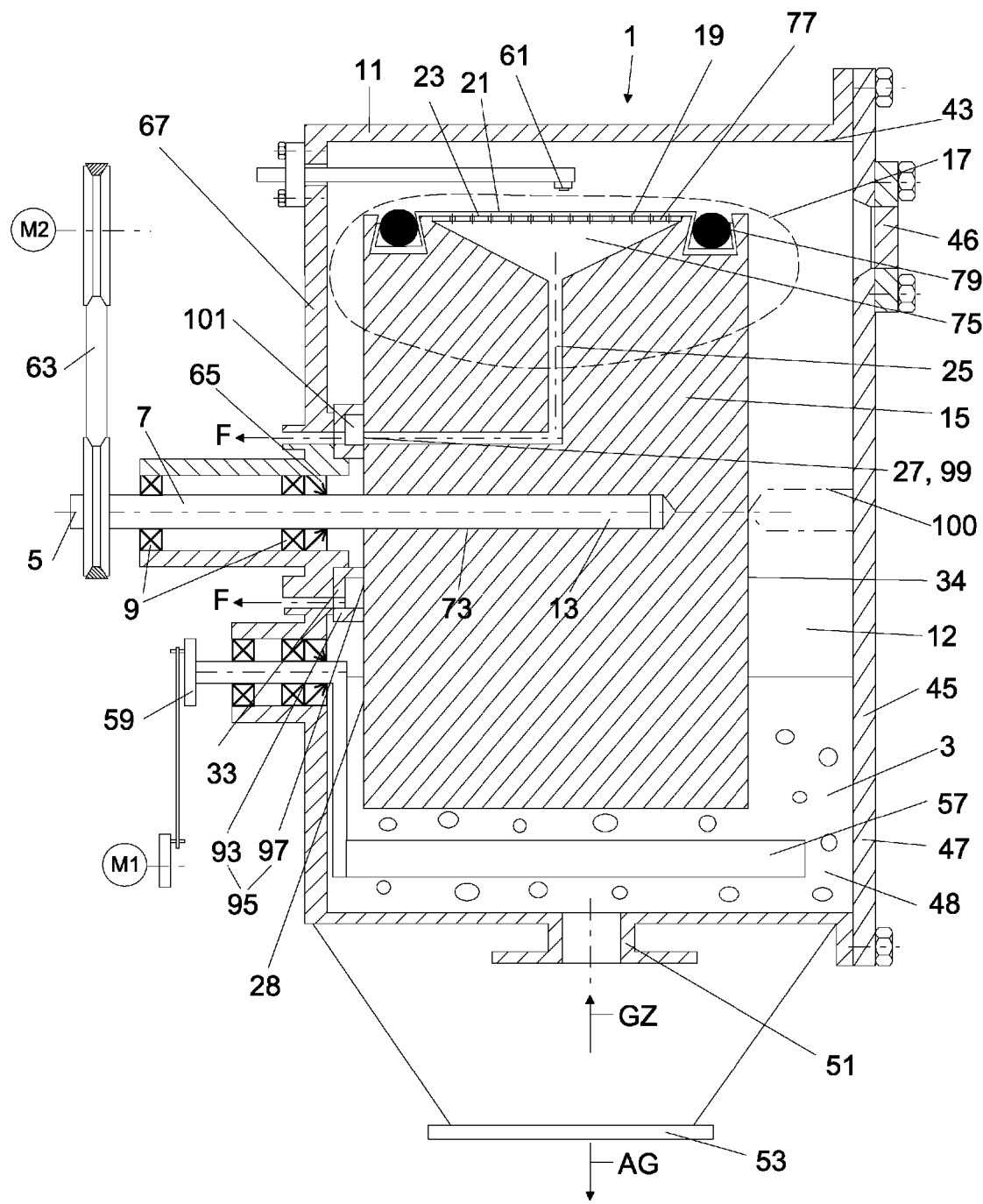
FIG. 1 shows a schematic, sectional side view of a filter device according to an embodiment of the invention.
Figure 2:
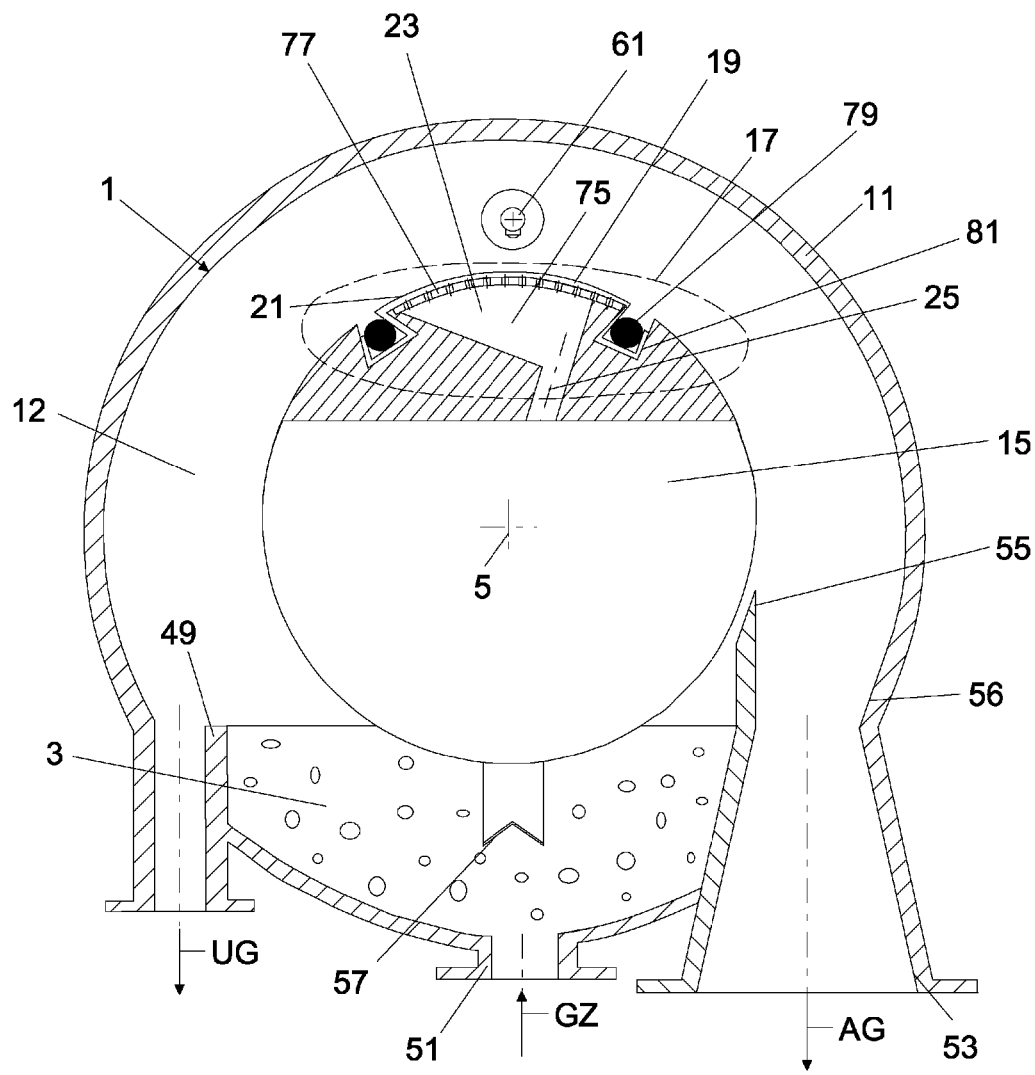
FIG. 2 shows a schematic, section frontal view of the filter device according to FIG. 1.

The filter device 1 as shown in FIGS. 1 and 2 for filtering out solid substance from a solid-liquid-mixture 3 in at least one embodiment according to the invention includes a bearing shaft 7 extending along a rotation axis 5 and being in form of a hollow rotary shaft which is rotatably supported in a housing 11 by a roller bearing 9 (a slide bearing may also be used) and having a free end 13 and a rotation body 15 detachably and non-rotatably attached to the free end 13 of the bearing shaft 7 and, hence, co-rotatable with the bearing shaft 7 about the rotation axis 5 as well as supported only on one side (cantilever) (that is, the bearing shaft 7, seen along the rotation axis 5, is supported and/or mounted in the housing 11 only on one axial side of the rotation body 15). A single filter cell 17 is present on the rotation body 15 and includes a filter structure 19 (for example, in form of a filter cloth) attached to the outer circumference of the rotation body 15 for filtering out the solid substance from the solid-liquid-mixture 3, allowing the liquid of the solid-liquid mixture 3 to pass therethrough from a filter structure inlet side 21 to a filter structure outlet side 23 and a connection channel 25 formed in the rotation body 15 and extending from the filter structure outlet side 23 and leading out at an outlet opening 27 which is formed on an axial side, facing the bearing shaft 7, of the rotation body 15 in a radial distance to the rotation axis 5 as well as, in this case, in a radial distance to the bearing shaft 7. The illustrated filter device further includes a control device 33, by which a plurality of lines F can be connected and/or will be connected to the (respective) connection channel 25 in dependence on the rotation position of the rotation body 15 in a controlled manner, e.g. selectively, (will be described in further detail below), wherein the control device 33 may also be provided as a pressure control device in order to control and/or adjust, e.g. vary, a pressure difference between the filter structure outlet side 23 and the filter structure inlet side 21 in dependence on the rotation position of the rotation body 15 from the filter structure outlet side 23.

The rotation body 15 has a cylinder drum shape, for example a circular cylinder drum shape, wherein the cylinder axis is arranged so as to extend co-axially to the rotation axis 5.

The housing 11 completely accommodates the rotation body 15 (that is, the rotation body is completely enclosed by the housing 11 and, hence, accommodated in the housing interior 12 thereof, for example accommodated in a sealed and/or fluidly sealed manner) and has, e.g., a cylinder drum shape conform to the outer circumferential movement path of the rotation body 15 and includes an opening 43 which, seen in direction of the rotation axis 5, is located on an axial side 34, facing away from the bearing shaft 7 and/or the bearing 9, of the rotation body 15, as well as includes a removable housing lid 45 which closes the opening 43 in a (fluidly) sealed manner. The opening 43 extends with its opening surface substantially perpendicularly to the rotation axis 5, wherein it is, e.g., formed substantially co-axially to the rotation axis 5. The opening 43 is arranged so as to be aligned to the rotation body 15 in the direction of the rotation axis 5 and has such a width that the rotation body 15 can be removed from the housing 11 through the opening 43 in the direction of and/or along the rotation axis 5, when the housing lid 45 is removed (or dismounted). Further, a viewing/inspecting window 46 is in the housing lid 45, which may be provided with an optical view enlarging lens.

The lower housing portion 47 of the housing 11 forms and/or provides (integrally formed with the housing) a pan for accommodating the solid-liquid mixture 3. The lower housing portion 47 defines an accommodation chamber 48 for accommodating the solid-liquid-mixture 3, wherein the accommodation chamber 48 and the housing interior 12 accommodating the rotation body 15 form an integral chamber unit defined by the same housing wall.

The fill level/gauge of the solid-liquid-mixture 3 is limited to a maximum by a level drain (or level drain port) 49. Excess mixture 3 is discharged in the direction of arrow UG and is, e.g., returned (for example in a continuous manner) back to the lower housing portion 47 via a pump circuit (not shown) through a mixture supply connection 51. The level drain 49 may be provided with an interchangeable adapter piece (e.g. an adapter tube piece), wherein adapter pieces of different tube length can be applied to adjust the fill level in accordance with the correspondingly adapted tube length. The level of the mixture 3 is adjusted in any case such that the outer circumferential movement path of the rotation body 15 extends through the mixture 3 to thereby be able to move the filter cell 17, in connection with the rotation of the rotation body 3, through the solid-liquid-mixture 15 in time intervals defined by the rotation speed and the outer circumference or the rotation body 15, and, hence, in a quasi-continuous manner.

The mixture or suspension supply connection 51 is proximate to at the lower housing portion 47 (e.g. in form of a connection tube or connection flange), via which solid-liquid-mixture 3 to be filtered can be continuously supplied and/or is continuously supplied to the housing 11 (arrow GZ (mixture supply)). In the present embodiment, the suspension supply connection 51 extends from an outer circumference radially and diametrically inwardly towards the rotation axis 5.

Further, a solid discharge opening 53 is formed at the outer circumference of the housing 11, which faces in a direction tangential to the outer circumferential movement path of the rotation body 15 and through which solid substance filtered out from the solid-liquid mixture 3 can be discharged and/or outputted (arrow AG (solid discharge)) from the filter device 1. A scraper 55 is arranged in the housing 11 upstream of the discharge opening 53, which, e.g. by means of a scraping edge, is arranged in a small distance to the outer circumference and/or outer circumferential movement path of the rotation body 15 in order to scrape away and/or strike off the solid substance, which adheres to the rotation body 15 and/or to the outer circumference thereof, from the rotation body 15 so that the solid substance falls into a discharge hopper or discharge channel 56, upstream of the discharge opening 53, in the housing 11.

The filter device 1 is further provided with a mixture agitation device or suspension agitation device having a reciprocally moveable agitating arm 57, which in this embodiment is driven by a crank drive mechanism 59 driven by an electrical motor M1.

The filter device 1 in a further embodiment includes a washing device having one or more washing nozzles 61 which are arranged adjacent to the outer circumferential movement path of the rotation body 15 and which are controllable in order to be able to spray, in a controlled manner, e.g. selectively, washing liquid onto the solid substance (solid substance filter cake) adhering to the outer circumference of the rotation body 15. The washing nozzle(s) 61 is connected to an electronic control unit (not shown) which controls/operates the washing nozzle(s) in dependence on the rotation position, which, e.g., has been detected by a rotation position sensor, of the rotation body 15. In order to prevent the washing liquid from getting into the mixture, collecting pans (not shown) may be arranged adjacent to the washing nozzle(s) 61 and adjacent to the outer circumferential movement path of the rotation body 15, by means of which the washing liquid, which does not reach the solid substance (filter cake) adhering on the outside of the filter structure 19 or which is repelled therefrom, can be caught and can be discharged by corresponding lines.

The bearing shaft 7 illustrated as rotary shaft is rotatably driven by means of a transmission (or drive shaft) 63 (in this case, in form of a belt transmission) driven by an electrical motor M2. Instead of the belt drive, any other type of transmission, such as, for example, a gear pinion transmission, a chain transmission, a friction gear transmission etc. may be used. The bearing shaft 7 is sealed against the housing wall 67 by means of a shaft sealing 65 (e.g. a rotary shaft seal). The housing wall 67 axially defines/limits the housing interior 12, accommodating the housing body 15, on the side of the bearing shaft 7 and/or the bearing 9.

The rotation body 15 is provided on the bearing shaft 7 so as to be removable therefrom, wherein the coupling between the rotation body 15 and the bearing shaft 7 at the free end (or free end portion) 13 facing the housing opening 43 is, e.g., provided by means of a quick fastener coupling 73, such as, for example, a bayonet fastener, a diary coupling, a snap fit connection, etc.

The single (or sole) filter cell 17 on the rotation body 15 includes a filter pocket 75 below the filter structure outlet side 23, which is formed in the outer circumference of the rotation body 15 and which is provided with an radial pocket depth which increases in an operational rotation direction (arrow BD) of the rotation body 15 in the circumferential direction thereof, wherein the connection channel 25 extends from the filter pocket 75 at the deepest pocket location of the filter pocket 75. In a cross section parallel to the rotation axis 5, the filter pocket 75 has a funnel shape tapering towards the connection channel 25. A perforated support plate 77 (filter structure support) is arranged over the filter pocket 75. The perforated support plate 77 covers a radial opening of the filter pocket 75 and along the radial outer side of which the filter structure 19 extends. In this embodiment, the filter structure 19 is an interchangeable flexible screen, e.g. a screen cloth, which extends over the filter pocket 75 and is held on the rotation body 15 by means of a fixing cord 79, for example an elastic fixing cord 79 or an O-ring, which extends around the filter pocket 75 and/or around the radial inlet opening thereof. The fixing cord 79 engages into a recess/groove 81, which is formed in the outer circumference of the rotation body 15 and which extends around the filter pocket 75. The filter cell 17 extends at the outer circumference of the rotation body 15, seen in the direction of the rotation axis 5, substantially over the major part of the width/height of the cylinder shape of the rotation body 15 as illustrated, for example, in FIG. 1.

The control device 33 in at least one embodiment includes a mechanical structural control unit 95 having a control disc 93 (also illustrated in FIG. 5) and a sealing disc 97. In this embodiment, the control disc 93 is an element separate from the housing 11 and is attached to the housing 11, in which the rotation body 5 is accommodated, in a non-rotatable and, hence, stationary manner. The control disc 93 is arranged on that side of the housing wall 67, arranged on the side of the bearing 9, which faces that axial side 28 of the rotation body 15, which faces the bearing 9. The control disc 93 in at least one embodiment is a ring-shape and extends co-axially around the rotation axis 5. In this embodiment, the ring-shaped control disc 93 is arranged on a ring-shaped housing projection which co-axially surrounds the bearing shaft 7 and axially projects towards the rotation body 15 from the housing wall 67 (also see embodiment of FIG. 4).

The sealing disc 97 is materially formed in one-piece/integrally with the rotation body 15 and includes through openings 99 which, because of their integral formation of the sealing disc 97 and the rotation body 15, are formed identically with the outlet openings 27 of the connection channels 25 (hence, the outlet openings 27 and the through openings 99 integrally overlap each other in a conforming manner).

The sealing disc 97 and the control disc 93 are in an axial (with respect to the rotation axis 5) fluidly sealed rotation engagement/slide contact at axial disc surfaces facing each other so that fluid/liquid is transferrable via the respective outlet opening/through opening 27, 99 between the respectively assigned (to the respective outlet opening/through opening 27, 99) connection channel 25 and the control disc 93.

Figure 5:
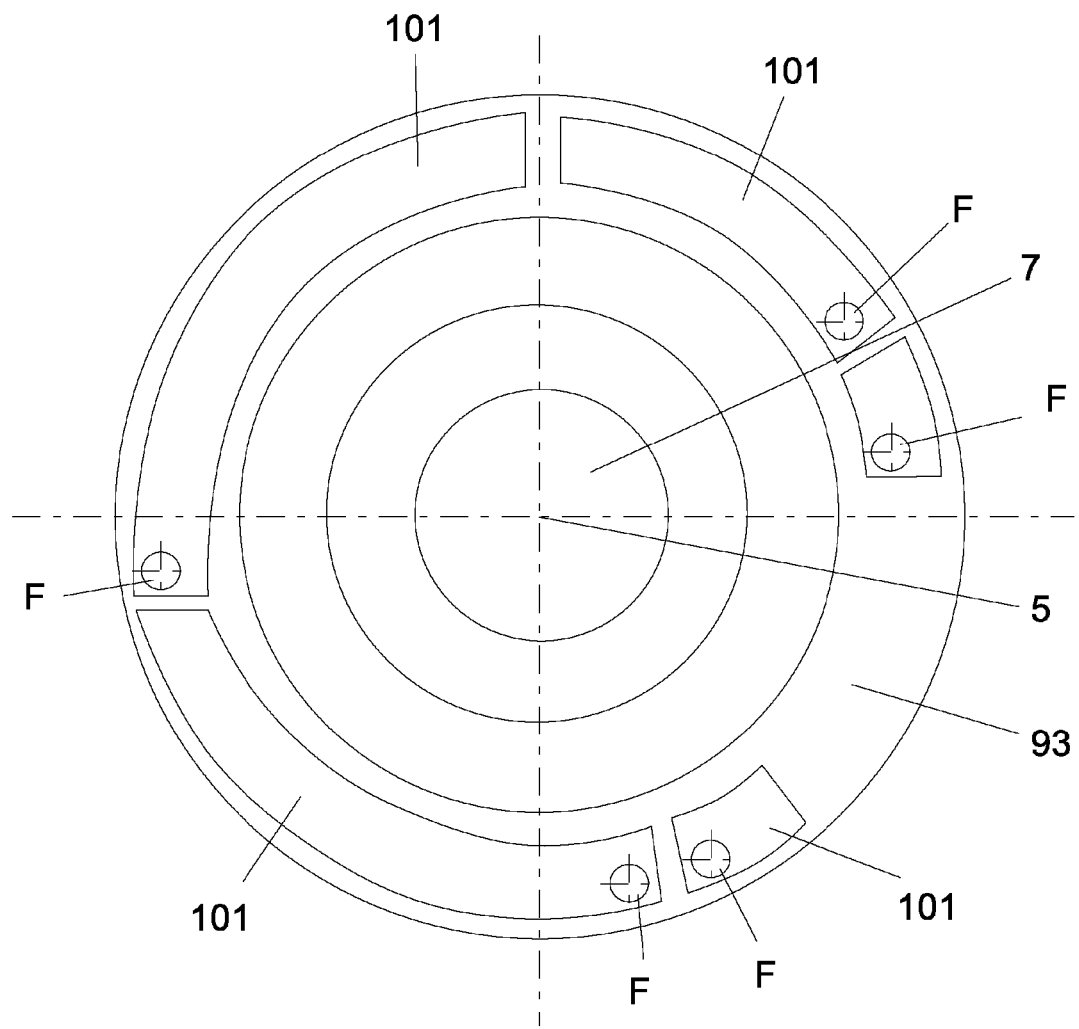
FIG. 5 shows a cut sectional front view along line a-a in FIG. 4, showing a front view of a control disc of a structural control unit.

Control openings 101 illustrated, for example, in FIGS. 1 and 5, which are separate from each other, are formed in the axial surface, facing the sealing disc 97, of the control disc 93, which extend co-axially to the rotation axis 5 and which are in connection with a respectively assigned (branch-off) line F. The radial distance of the control openings 101 (and, in this variation, of the (branch-off) lines F also) to the rotation axis 5 substantially corresponds to the radial distance of the outlet openings/through openings 27, 99 (in the embodiment of FIGS. 1 and 2, of the single outlet opening/through opening 27, 99) to the rotation axis 5 so that in case of relative rotation of the sealing disc 97 relatively to the control disc 93 the respective through opening/outlet opening 27, 99 successively and repeatedly overlaps the control openings 101. Per control opening 101 also more than one line F may be arranged and/or may be in connection therewith.

Via the different control openings 101 and the respective (branch-off) line F connected thereto, fluid which is present in the connection channel 25 may, e.g., be individually discharged in a controlled manner in dependence on the rotation position of the rotation body 15, and, for example, the respective connection channel 25 may also be provided with a different under pressure/over pressure (e.g., by having provided, for example permanently provided, the respective line with a respectively predetermined under pressure/over pressure) in order to correspondingly suck (or draw) off, if necessary, mixture liquid via one (or more) branch-off lines F assigned to this mixture liquid, suck off wet air for drying the solid substance adhering to the filter cell 17 via another branch-off line F assigned to this wet air, suck off washing liquid (via still another of the branch-off lines F), and, if necessary, supply pressurized air. A predetermined over pressure/under pressure may be permanently provided in the respective branch-off line F, which, when the respectively assigned control opening 101 is overlapped by the through opening 99/outlet opening 27, is immediately applied to the connection channel 25 connected thereto. The pressure control may also be selected such that the same (under) pressure is present in those (branch-off) lines F which are provided for discharging a fluid (such as, e.g., the liquid separated from the mixture, washing liquid or wet gas/wet air) or is present in all (branch-off) lines F.

In the embodiment of FIGS. 1 and 2, when removing the rotation body 15 from the free end/end portion 13 of the bearing shaft 7, the sealing disc 97, because of its integral formation with the rotation body 15, will be automatically separated from the control disc 93 fixedly attached to the housing 11 so that the control disc 93 is immediately accessible for cleaning and/or inspection and/or, if necessary, for interchanging the control disc 93 (if dismountable).

The (branch-off) lines F which are branched-off from the control disc 93 are formed to extend in a direction substantially parallel to the rotation axis 5 through the housing 11 and/or through the housing wall 67, which extends transversely to the rotation axis 5, and in a direction away from the rotation body 15, wherein the (branch-off) lines F extend in a radial distance from the bearing shaft 7 as well as in a radial distance from the bearing and radially outside thereof.

As discussed above, the connection channel 25 can be provided with, e.g., different pressures/under pressures (which, e.g., are permanently present in the respective branch-off line with a predetermined magnitude) in a controlled manner via the diverse (branch-off) lines F to thereby selectively provide a pressure difference between the filter structure inlet side 21 and the filter structure outlet side 23 in a controlled manner.

A predetermined under pressure or over pressure is, for example, present in the respective (branch-off) line F (e.g., with respect to the filter structure inlet side 21) so that when providing a connection between the respective (branch-off) line F and the connection channel 25, the corresponding over pressure or under pressure is applied to the filter structure outlet side 23 in a relatively quick manner. In those (branch-off) lines F, which are provided for discharging fluid from the connection channel 25, the same under pressure also may be permanently present.

In addition to the mechanical structural control unit 95, the control device 33 may also include a pressure control valve in the respective (branch-off) line F for continuously or discretely adjusting the pressure/under pressure (for example in dependence on the rotation position of the rotation body).

The control device 33 in a further embodiment may further include a housing interior pressure control device, by means of which the housing interior 12 of the housing 11 can be provided with over pressure and/or under pressure to thereby be able to also adjust the pressure difference between the filter structure inlet side 21 and the filter structure outlet side 23 from the filter structure inlet side 21.

The operation of the filter device 1 in at least one embodiment is as follows. The cylinder drum shaped rotation body 15 is co-rotated with the rotatably driven bearing shaft 7 in operational rotation direction (arrow BD), whereby the filter cell 1 runs through the solid-liquid-mixture 3, accommodated in the lower housing portion 47, in regular (or, in case of changing rotational speed, in corresponding irregular) time intervals and, hence, quasi-continuously, wherein the solid-liquid mixture 3 is, e.g., continuously supplied with solid-liquid mixture 3 via the suspension/mixture supply connection 51.

In an operation condition, in which the filter cell 17 submerges in the mixture 3, the small control opening 101, shown in FIG. 5 at a lower right location, is, e.g., in fluid connection with the connection channel 25 in order, e.g., to output an over pressure to again briefly blow out the filter structure 19 within the mixture 3 (wherein, e.g., bubbles are generated in the mixture 3). When further rotating the rotation body 15, wherein the filter cell 17 is still within the mixture 3, the connection channel will become fluidly connected with the control opening 101, shown in FIG. 5 at a lower left location, via which an under pressure is applied for sucking in mixture 3 to the filter structure inlet side 23 (filtering operation). The control opening 101, shown in FIG. 5 at an upper left location, can, e.g., serve sucking off washing liquid (when the filter cell 17 is in the area of the washing nozzle 61), and the larger control opening 101, shown in FIG. 5 at an upper right location, may serve sucking off wet gas/wet air when the solid substance cake adhering to the outside of the filter structure 19 dries (when the filter cell 17 is in the area between the washing nozzle 61 and the scraper 55). Further, via the succeeding smaller control opening, shown in FIG. 5 at an upper right location, a short over pressure impulse may be applied to blast away the filter cake from the rotation body 15.

Thus, by means of the control disc 93, having one or more control openings 101, of the structural control unit 95 of the control device 33, fluid can be discharged from the connection channel 25 in dependence on the rotation position of the rotation body 14 in any desired controlled manner and, e.g., the pressure difference between the filter structure inlet side 21 and the filter structure outlet side 23 can be manipulated from the filter structure outlet side 23 to thereby optimize the filtering result, for example, with regard to a product quality required by the pharmaceutical industry. By the continuous rotation of the rotation body 15 an increased productivity is achieved. The possible one-side and/or cantilever bearing of the rotation body 15 reduces the size of the device and the dead space for dirt accumulation. Further, the rotation body is easily accessible for cleaning purposes and, if necessary, is easily dismountable, too. The discharge of the liquid in the area, e.g., adjacent to and around the rotation axis 5 and/or the bearing shaft 7 results in short discharge ways, whereby space for dirt accumulation is further reduced.

Figure 3:
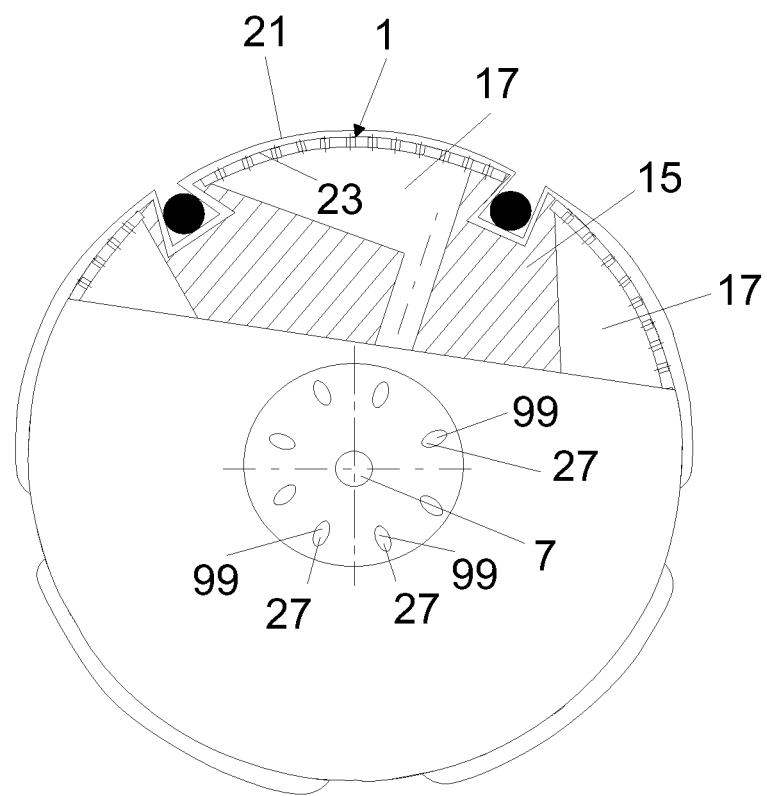
FIG. 3 shows a partially sectioned frontal view of a rotation body according to another embodiment of the invention.
Figure 4:
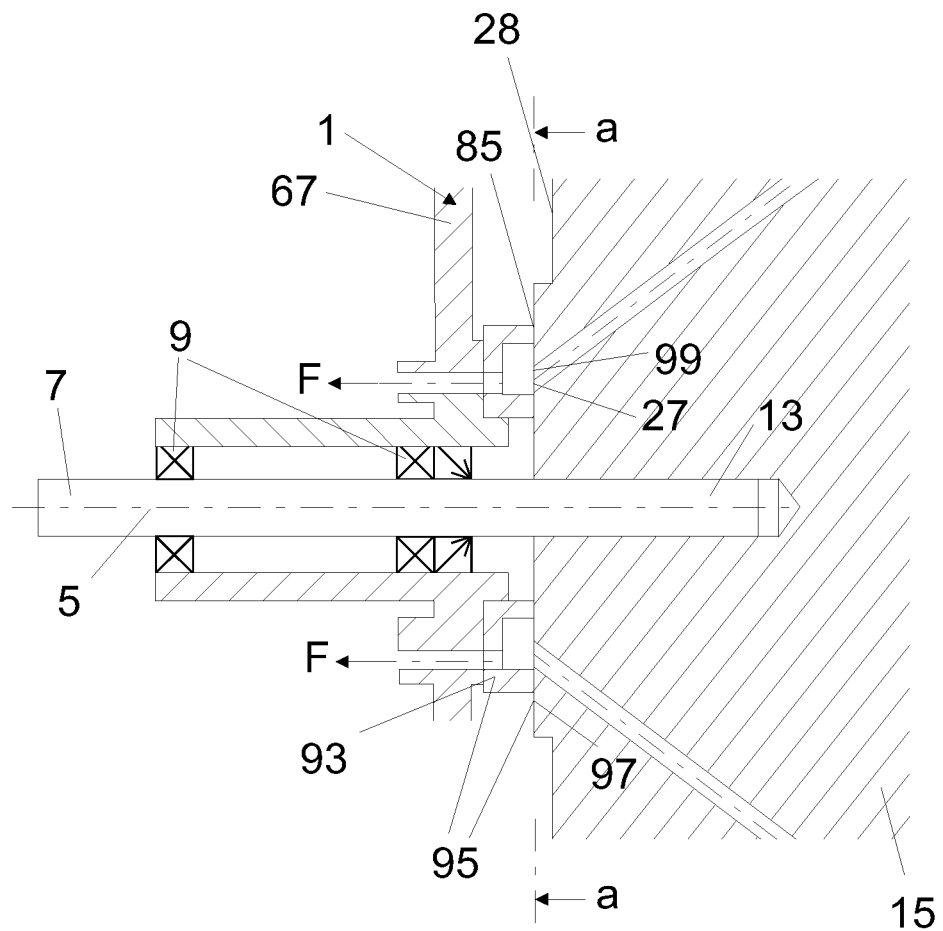
FIG. 4 shows a cut sectional side view of the rotation body of FIG. 3, showing the connection of the rotation body with a bearing shaft.

FIG. 3 shows a partial sectional frontal view of a rotation body 15 according to a further embodiment of the filter device 1 of FIGS. 1 and 2. FIG. 4 shows a cut sectional side view of the rotation body 15 of FIG. 3, showing the connection 85 between the rotation body 15 and the bearing shaft 7. FIG. 5 shows a cut sectional front view along line a-a of FIG. 4, showing a front view of the control disc 93 of the structural control unit 95 (including the control disc 93 and the sealing disc 97) of the control device 33 of the filter device 1 of FIGS. 1 to 4.

In contrast to the rotation body 15 according to the embodiment of FIGS. 1 and 2, the rotation body of FIGS. 3 and 4 does not include only one filter cell 15, but the rotation body 15 of the filter device 1 according to the embodiment of FIG. 3 is formed as a cylinder-drum-shaped multiple-filter-cell-rotation-body, in the outer circumference of which a plurality of filter cells 17 is provided, which respectively may be and/or are formed in accordance with the single filter cell 17 of the embodiments of FIGS. 1 and 2 and which are successively arranged in circumferential direction of the rotation body 15. The outlet openings 27, which are formed identically with the through openings 99 of the sealing disc 97 and at which the connection channels 25, extending from the filter structure outlet side 23, of the filter cells 17 lead out, are located on that axial side 28 of the rotation body 15 (with respect to longitudinal direction of the rotation axis 5) at which the bearing 9, which is provided only on one side, is arranged. The outlet openings 27 are arranged co-axially with respect to the rotation axis 5 in a radial distance to the rotation axis 5 and to the bearing shaft 7 around the rotation axis 5 and the bearing shaft 7. The respective outlet opening 27 is further formed in radial direction in an elongated manner so that, seen in circumferential direction of the rotation body, more outlet openings can be arranged with a predetermined outlet opening cross section.

The control disc 93 is formed as described in connection with FIGS. 1 and 2 and is arranged on a projection extending from the housing wall 67 towards the rotation body 15. The whole structural control unit 95 is located between the housing wall 67 and the rotation body 15. The housing wall 67 in this aspect is located, seen in direction of the rotation axis 5, at a level of the bearing 9, and in further detail, it is located between a pair of ring bearings of the bearing 9.

Figure 6:
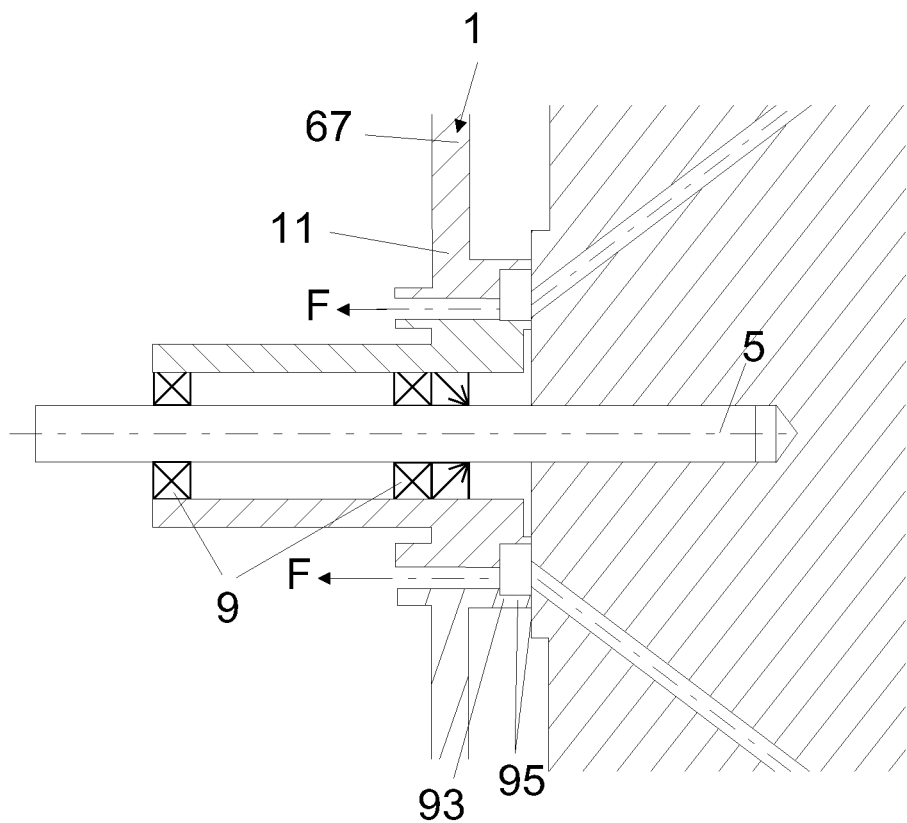
FIG. 6 shows a cut sectional side view of a structural control unit according to another embodiment according to the invention.

FIG. 6 shows a cut sectional side view of a structural control unit 95 in accordance with another embodiment of the filter device 1 of FIGS. 1 to 5, wherein the difference to the embodiment of FIGS. 1 and 2 is that the control disc 93 is materially connected with the housing 11 in one-piece and that the housing wall 67 is located at the level (seen in direction of the rotation axis 5) of the bearing 9.

Figure 7:
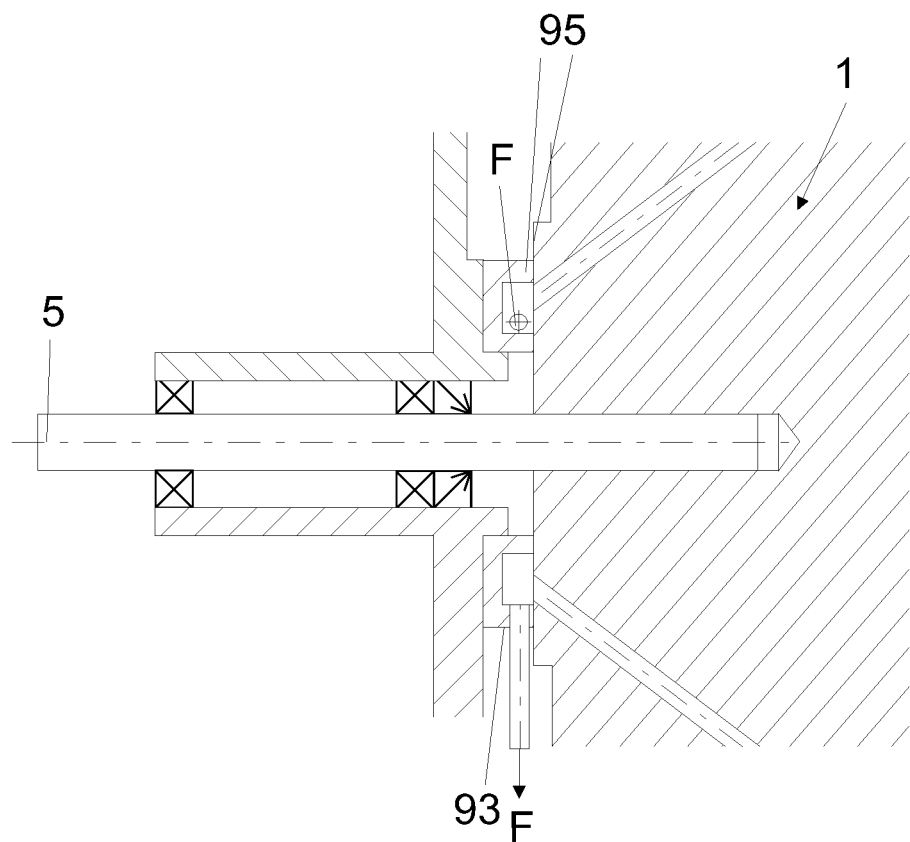
FIG. 7 shows a cut sectional side view of a structural control unit according to still another embodiment according to the invention.

FIG. 7 shows a cut sectional side view of a structural control unit 95 according to still another embodiment of the filter device 1 of FIGS. 1 to 5, wherein the difference to the embodiment of the invention as shown in FIGS. 1 to 5 is that the (branch-off) lines F do not extend from the control disc 93 in parallel to the rotation axis 5, but extend from the control disc 93 radially to the rotation axis 5.

Figure 8:
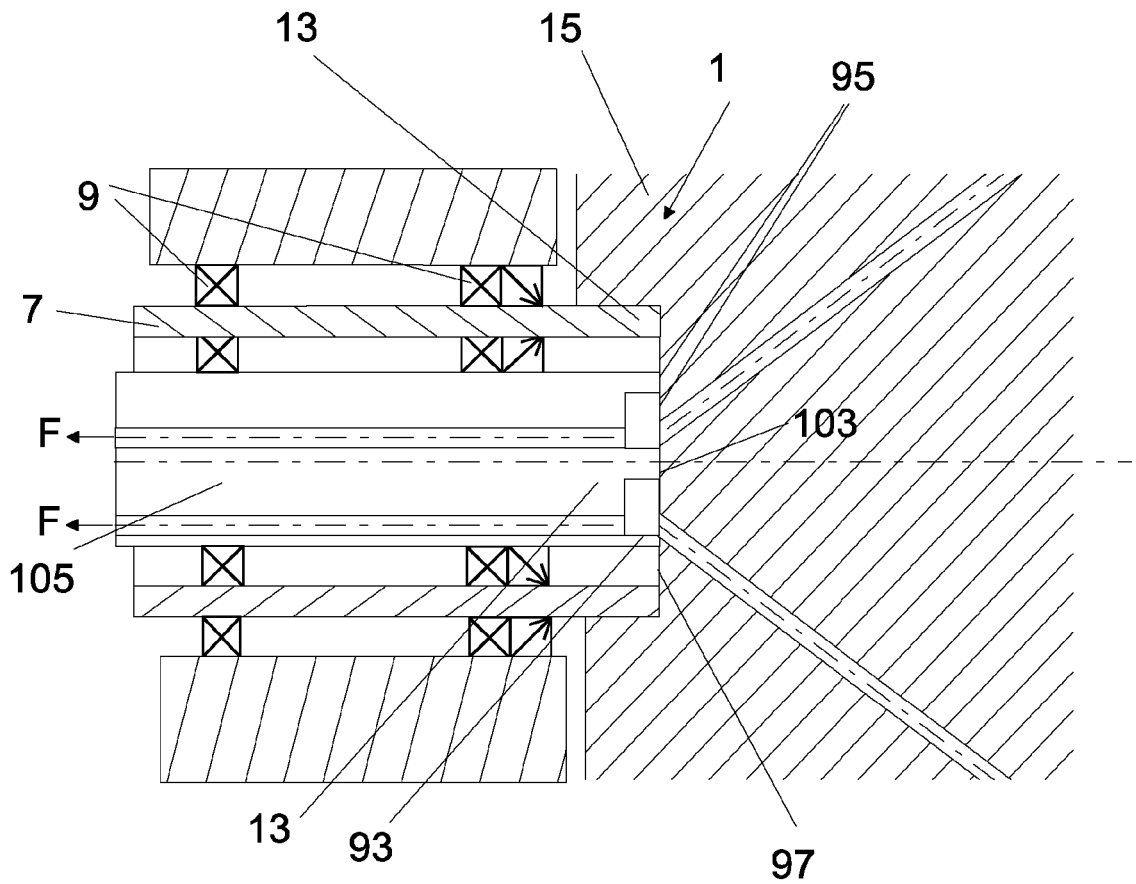
FIG. 8 shows a cut sectional side view of a structural control unit according to still another embodiment according to the invention.

FIG. 8 shows a cut sectional side view of a structural control unit 95 according to still another embodiment of the filter device 1 of FIGS. 1 to 5, wherein the difference to the embodiment of the invention as shown in FIGS. 1 to 5 is that the sealing disc 97 is not formed in the form of a projection portion axially protruding towards the bearing shaft 7 (cf., e.g., FIGS. 1 and 4), but is provided in an axial recess (at the bottom surface thereof) which is formed in the rotation body 15 to be recessed in axial direction away from the bearing shaft 7 and/or from the bearing 9, and wherein the control disc 93 is formed at a front end 103 of a control shaft 105 which is guided through the bearing shaft 7 provided as a rotatably driven hollow rotary shaft. The bearing shaft 7, with its free end 13, axially engages the recess in the rotation body 15, wherein in this engaging condition the free end 13 of the bearing shaft 7 and, hence, the bearing shaft 7 are non-rotatably connected with the rotation body 15. The free end 13 of the bearing shaft 7, e.g., has the same diameter as the recess so that an axial form fit is provided therebetween. The control shaft 105 is, with its front end 103 facing the rotation body 15 and, hence, with the control disc 93, in a sealed/fluidly sealed rotation engagement/slide contact with the bottom surface of the recess in the rotation body 15 and thereby with the sealing disc 97.

Figure 9:
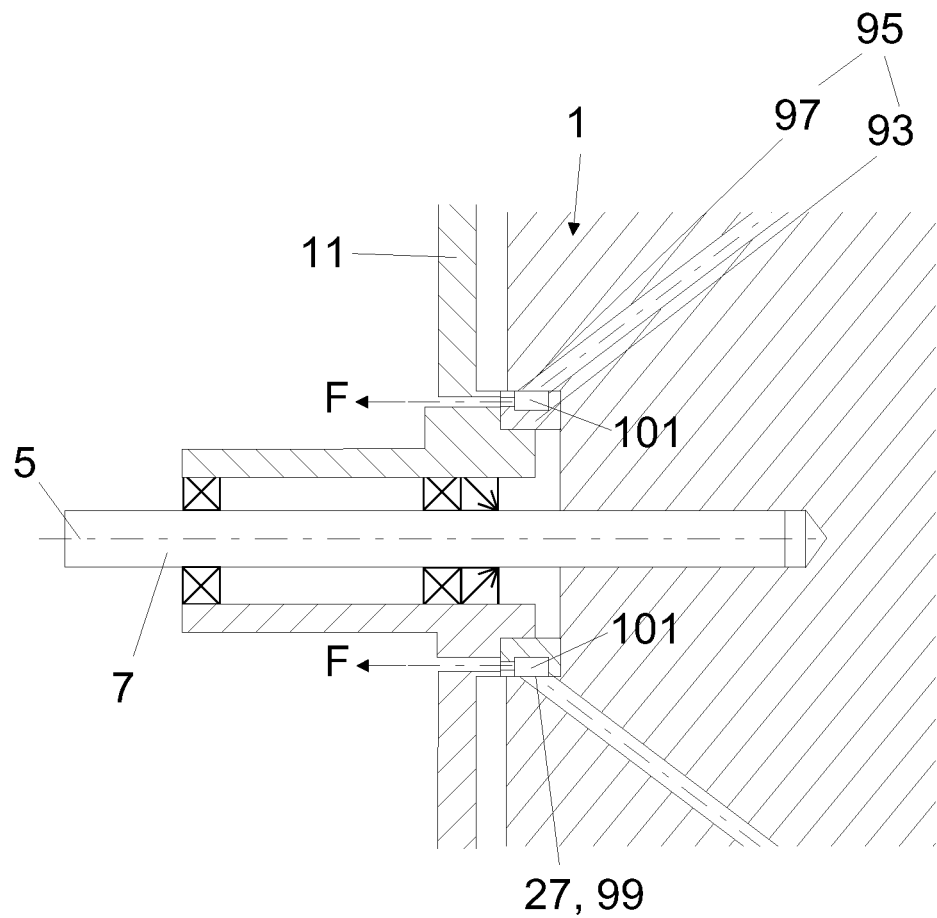
FIG. 9 shows a cut sectional side view of a structural control unit according to still another embodiment according to the invention.

FIG. 9 shows a cut sectional side view of a structural control unit 95 according to still another embodiment of the filter device of FIGS. 1 to 5, wherein the difference between the embodiment as shown in FIGS. 1 to 5 is that the control disc 93 and the sealing disc 97 of the structural control unit 95 are not in an axial rotation engagement/slide contact with respect to the rotation axis 5, but they are in a radial rotation engagement/radial slide contact with each other. To this end, according the embodiment of FIG. 9, a circular cylinder recess facing the bearing shaft 7 is formed in the rotation body, which, as it is the case for the bearing shaft 7, is formed to have its circumferential wall provided co-axially to the rotation axis 5. The sealing disc 97 is integrally formed with the circumferential wall of the circular cylinder recess and is in rotation engagement/slide contact with the control disc 93 which in form of a ring co-axially extends around the bearing shaft 7 and is non-rotatably attached to the housing 11. In contrast to the embodiments of FIGS. 1 to 5, according to which the control disc 93 and the sealing disc 97 are in an axial rotational engagement with each other with respect to the rotation axis 5, the control disc 93 and the sealing disc 97 according to the embodiment of FIG. 9 are in a fluidly sealed radial rotation engagement/slide contact. Accordingly, the through openings/outlet openings 99, 27 in the sealing disc 97 and/or in the rotation body 15 as well as the control openings 101 in the control disc 93 are oriented in a radial direction (with respect to the rotation axis 5) and are, in this embodiment, formed in the inner wall of the circular cylinder recess and/or in the outer circumferential wall of the control disc 93.

Figure 10A:
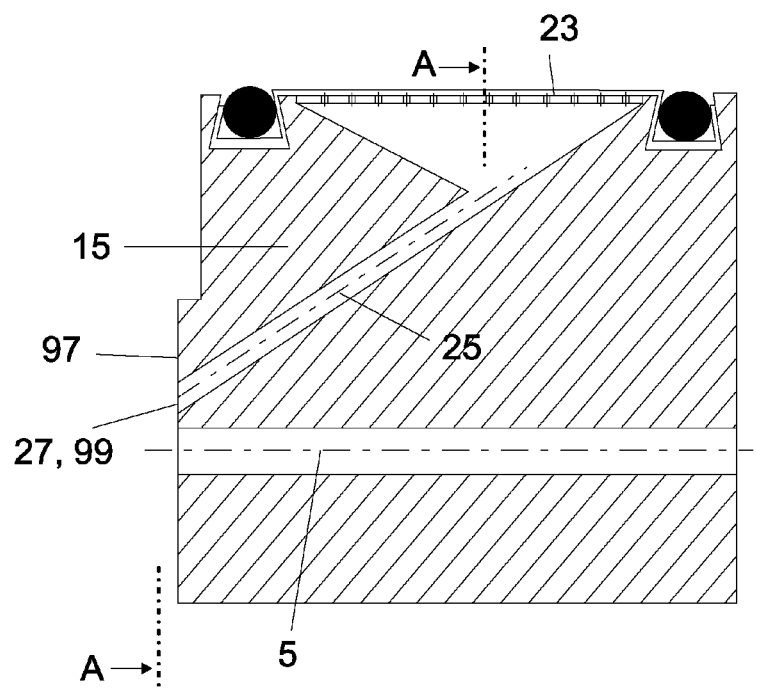
FIGS. 10a and 10b show a schematic sectional side view and a schematic front view, respectively, of a rotation body according to another embodiment according to the invention.
Figure 10B:
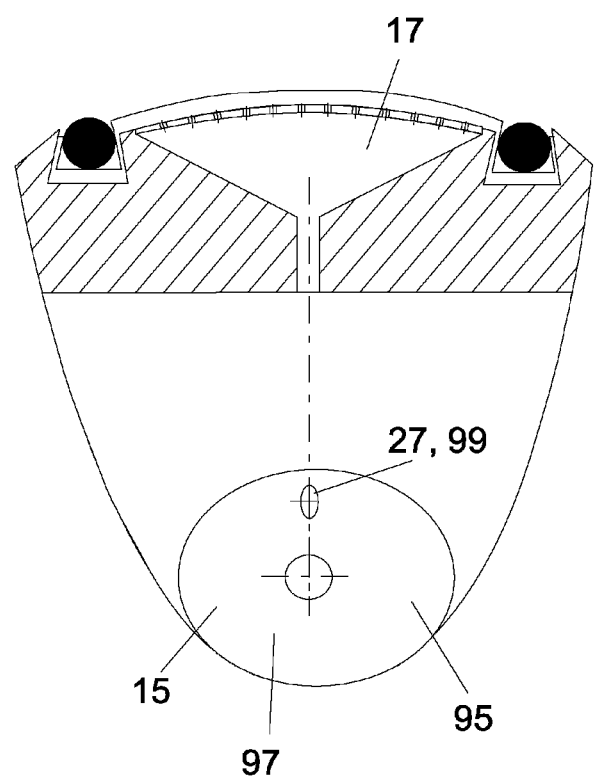

FIGS. 10a and 10b show a schematic sectional side view and a schematic front view, respectively, of a rotation body 15 according to another embodiment of the filter device 1 of FIGS. 1 to 5, wherein in accordance with the embodiment of FIGS. 1 and 2 and in contrast to the embodiment of FIGS. 3 and 4, the rotation body 15 is formed as a single filter cell rotation body having only one filter cell 17. Correspondingly, the sealing disc 97 of the structural control unit 95 (of which FIGS. 10a and 10b only show the sealing disc 97) is provided with only one through opening 99 and/or outlet opening 27 therein, at which the connection channel 25 coming from the filter cell 17 leads out. The structural control unit 95 may otherwise be provided as shown in FIGS. 1 to 5. Because of the use of only one filter cell 17, a drum-shaped formation of the rotation body 15 may, e.g., be omitted. In FIGS. 10a and 10b the rotation body 15 is, e.g., provided as a cylinder segment body. The connection channel 25, which connects the filter structure outlet side 23 with the control disc 97, extends, in this embodiment, in an angle to both the rotation axis 5 and to the perpendicular to the rotation axis 5. The connection channel 25, however, may also, e.g., include a first channel portion, which extends from the filter structure outlet side 23 of the filter cell 17 substantially perpendicularly to the rotation axis 5 and inwardly, and a second channel portion which, starting from the first channel portion, extends parallel to the rotation axis 5 to the outlet opening 27 (also compare with the embodiment of FIG. 12).

Figure 11:
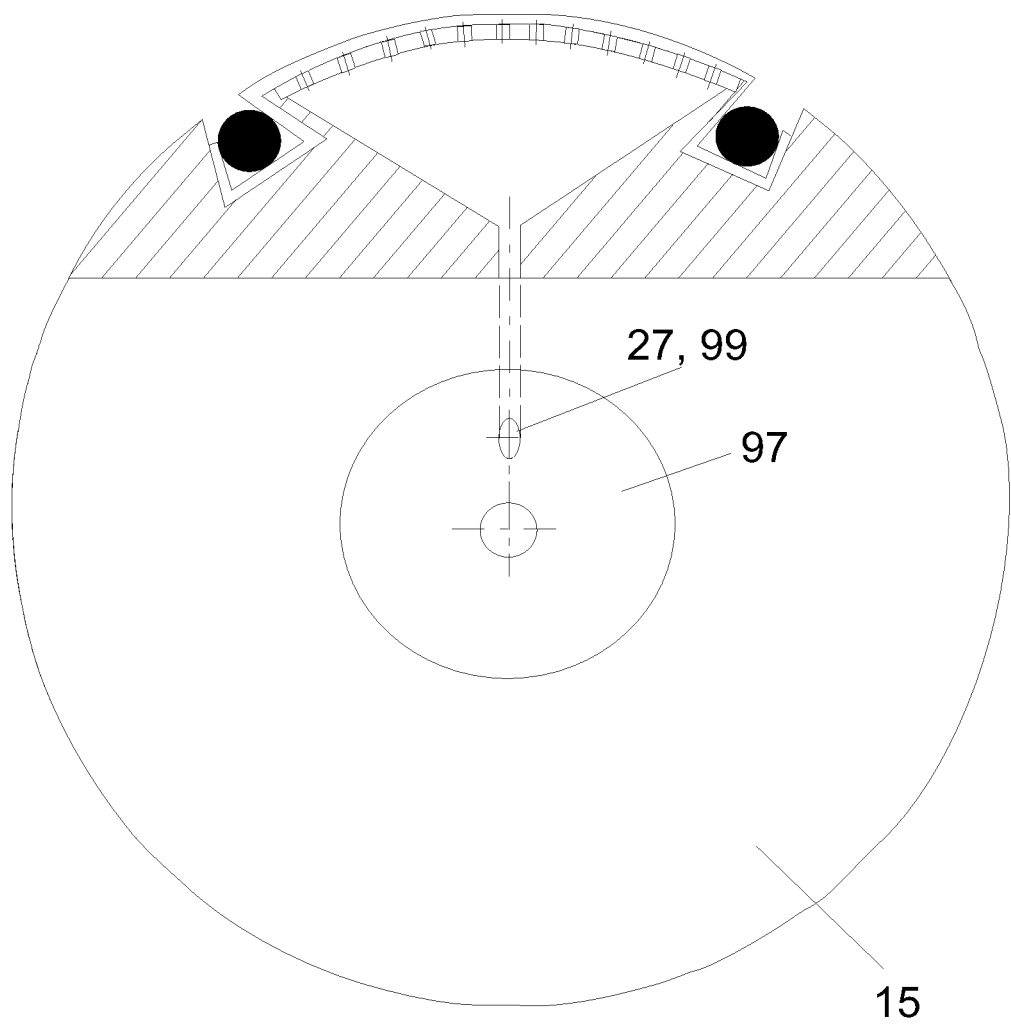
FIG. 11 shows a schematic sectional side view of a rotation body according to still another embodiment according to the invention.

FIG. 11 shows a schematic sectional side view of a rotation body 15 according to still another embodiment of the filter device of FIGS. 1 and 2, wherein the difference to the embodiment of FIGS. 1 and 2 is merely that the drum-shaped rotation body 15 has a sealing disc 97 formed thereon as an axial projection (axially projecting towards the control disc 93) (such as, e.g., it is the case in the embodiment of FIG. 4), in which the outlet opening 27 is integrally formed with the through opening 99.

Figure 12:
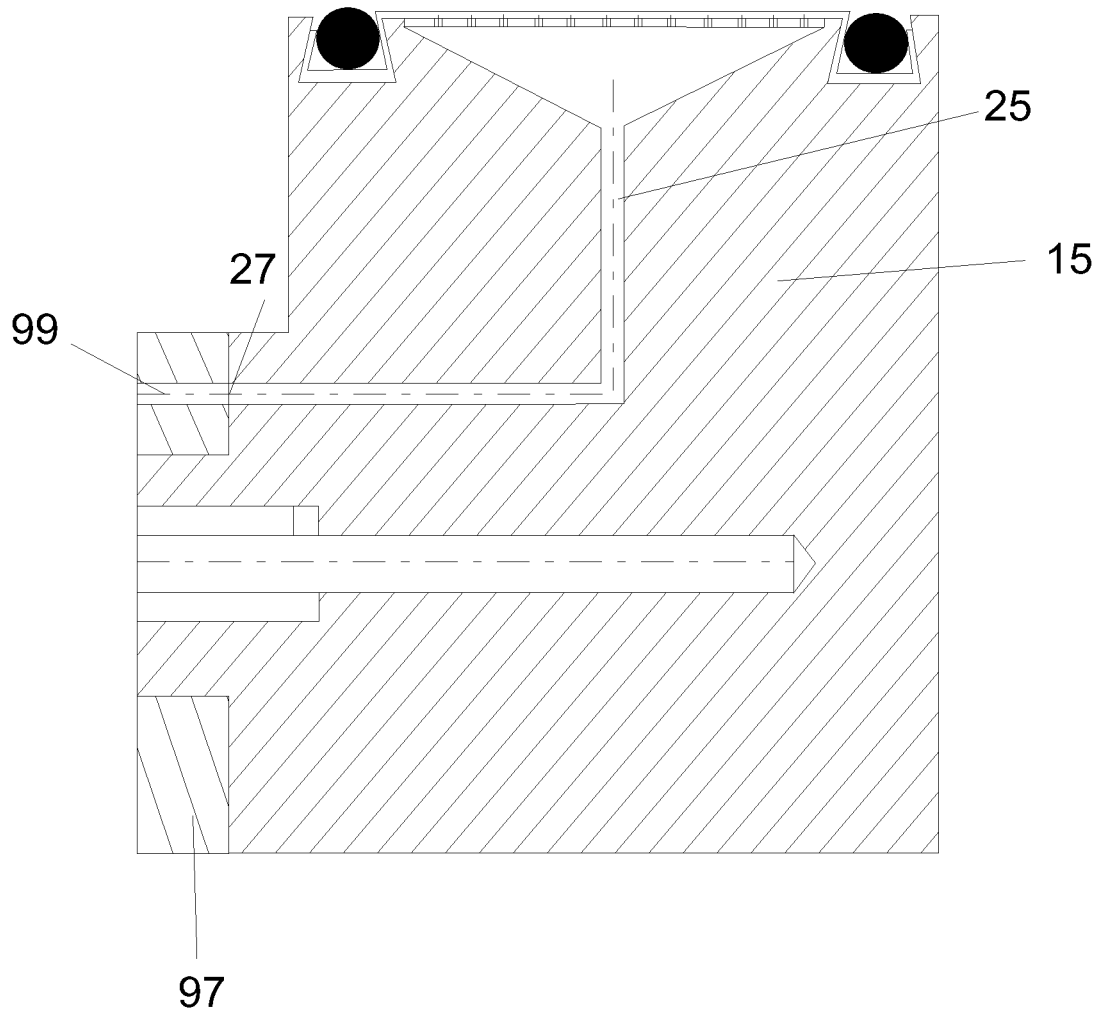
FIG. 12 shows a schematic sectional side view of a rotation body according to still another embodiment according to the invention.

FIG. 12 shows a schematic sectional side view of a rotation body 15 according to still another embodiment of the filter device according to FIGS. 1 and 2, wherein the sealing disc 97 is not integrally formed with the rotation body 15, but is a separate element which is non-rotatably attached to the rotation body 15, for example, screwed thereto. The connection channel 25 extends, as discussed above, perpendicularly to and towards the outlet opening 27. The through opening 99 in the sealing disc 97 is arranged to (radially) overlap, in this case to be axially aligned with, the outlet opening 27.

Figure 13:
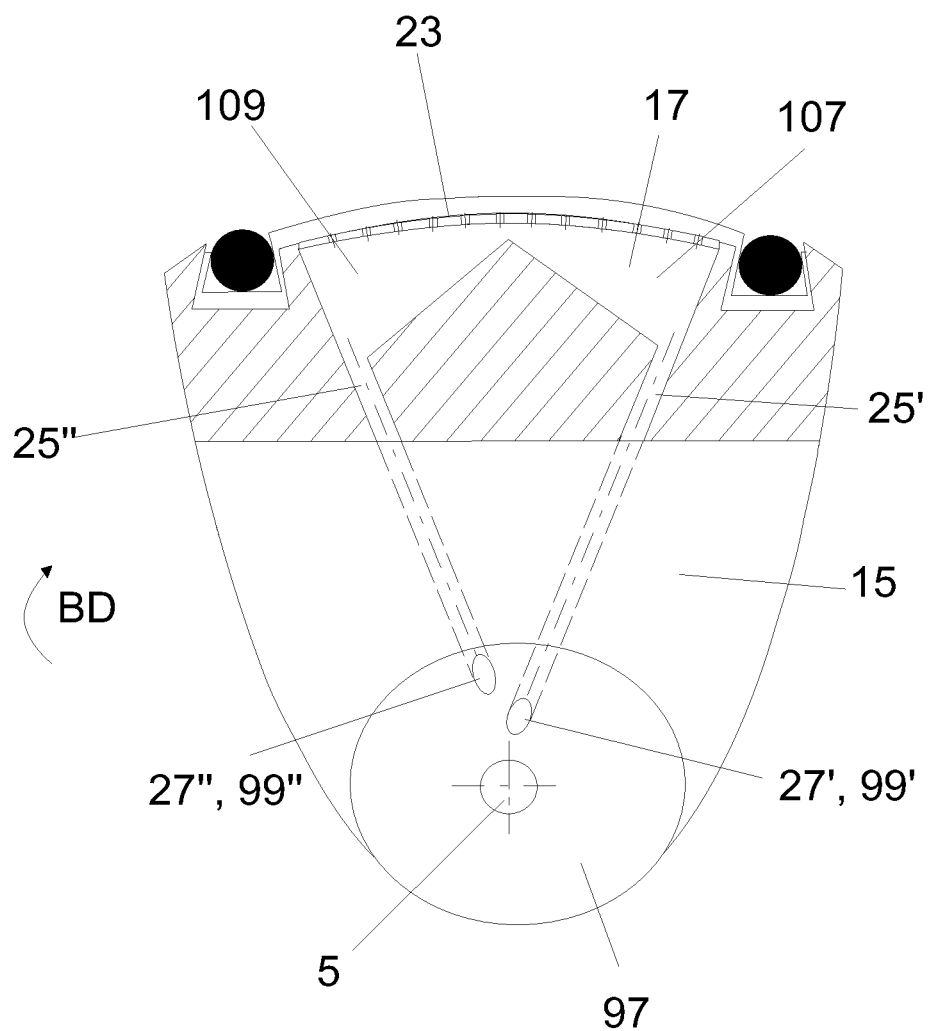
FIG. 13 shows a schematic sectional side view of a rotation body according to still another embodiment according to the invention.

FIG. 13 shows a schematic sectional side view of a rotation body 15 according to still another embodiment of the filter device of FIGS. 1 and 2, wherein the filter cell 17 in this embodiment includes a first connection channel 25' and a second connection channel 25", which extend from the filter structure outlet side 23 of the filter cell 17 to respectively assigned first and second outlet openings 27', 27", respectively. Since the sealing disc 97 in this embodiment is integrally formed with the rotation body, the outlet openings 27', 27" simultaneously form the through openings 99', 99" of the sealing disc 97. The rotation body 15 in a further embodiment may also be formed as multiple-filter-cell-rotation-body having a plurality of filter cells 17, from each of which a first and a second connection channel correspondingly extends. The first outlet opening(s) 27' is arranged in a radial distance (with respect to the rotation axis 5) to the second outlet opening(s) 27", wherein no radial overlapping occurs. Thereby, the first outlet opening(s) 27' and the second outlet opening(s) 27" can be assigned to correspondingly separate/independent control openings of the control disc 93, of which, for example, those control openings, which are assigned to the first outlet opening(s)/through opening(s) 27', 99', serve discharging and supplying of gaseous fluid (wet gas during drying of the filtered out solid substance or pressure air for blasting off the filtered out solid substance from the rotation body) and of which, for example, those control openings, which are assigned to the second outlet opening(s) 27", 99", serve discharging of liquid fluid (e.g., liquid from the mixture or washing liquid). The (respective) first connection channel 25', which, e.g., serves the transfer of gaseous fluid, may, e.g., be arranged on a, in rotation direction and/or operational rotation direction (arrow BD), leading end portion 107 of the filter cell 17, and the (respective) second connection channel 25", which, e.g., serves the transfer of mixture liquid separated by the filter cell 17, may, e.g., be arranged on a, in rotation direction and/or in operational rotation direction (arrow BD), trailing end portion 109 of the filter cell 107. Thereby, liquid separated from the solid-liquid mixture is collected in the trailing end portion 109 of the filter cell 17 (until the upper rotation reversal point of the filter cell 17) to be discharged from there via the second connection channel 25" in a reliable manner, and via the leading end portion 107 of the filter cell 17, for example after the filter cell 17 is passed over the upper rotation reversal point, wet gas can be discharged or pressurized air can be supplied.

In the above embodiment, the rotation body 15 has been described as being a rotation body 15 which is supported only on one side. In FIG. 1, there is depicted a embodiment in dash-point-line, according to which the rotation body 15 is additionally rotatably supported by an auxiliary bearing 100 at an axial side facing away from the bearing 9 (with respect to the rotation axis 5). In this embodiment, the auxiliary bearing 100 is attached to the housing lid 45 so that by removing the housing lid 45 the auxiliary bearing 100 will be automatically removed.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

We claim:

1. A filter device for filtering out of a solid substance from a solid-liquid-mixture, the filter device comprising:
    a bearing shaft which extends along a rotation axis;
    a rotation body which is detachably attached to the bearing shaft and which is supported by the bearing shaft to be rotatable about the rotation axis;
    at least one filter cell is formed on the rotation body and includes:
        a filter structure attached to the rotation body for filtering out the solid substance from the solid-liquid-mixture, allowing the liquid of the solid-liquid-mixture to pass therethrough from a filter structure inlet side to a filter structure outlet side, and
        a connection channel which is formed in the rotation body and extends from the filter structure outlet side to an outlet opening which is formed on an axial side of the rotation body in a radial distance to the rotation axis;
    a control device having a structural control unit for providing a connection between the respective outlet opening and a plurality of lines in a controlled manner, wherein the structural control unit includes
        a sealing disc provided to be co-rotatable with the rotation body and in which a through opening is formed corresponding to the respective outlet opening, and
        a stationary control disc which is in a fluidly sealed slide rotational engagement with the sealing disc and in which control openings are formed, which are connected to a respective line and which are connected to the respective through opening of the sealing disc in dependence on the rotation position of the rotation body in order to connect the filter structure outlet side of the respective filter cell with the respective line in dependence on the rotation position of the rotation body, and a housing having a housing interior accommodating the rotation body, wherein the structural control unit is arranged in the housing between an axial wall, which axially defines the housing interior and extends transversely to the rotation axis, and the rotation body, and wherein at least one of the control disc and the sealing disc are formed as an interchangeable part separate from the housing.

2. The filter device according to claim 1, wherein the bearing shaft is supported by a bearing connected to the housing.

3. The filter device according to claim 2, wherein the bearing is arranged in the housing wall.

4. The filter device according to claim 1, wherein the bearing shaft has a free end and wherein the rotation body is detachably attached to the free end of the bearing shaft as well as is supported by the bearing shaft via a bearing only on one side.

5. The filter device according to claim 4, wherein the housing wall is arranged at the side of the bearing shaft.

6. The filter device according to claim 1, wherein the structural control unit is arranged between a bearing, supporting the bearing shaft, and the rotation body.

7. The filter device according to claim 1, wherein the sealing disc is materially connected with the rotation body in one piece.

8. The filter device according to claim 1, wherein the housing includes a lower housing portion which defines an accommodation chamber for accommodating the solid-liquid-mixture, wherein the accommodation chamber and the housing interior accommodating the rotation body form a chamber unit defined by the same housing wall.

9. The filter device according to claim 1, wherein the rotation body and the sealing disc are arranged to be dismountable such that, when removing the rotation body from the bearing shaft, the sealing disc will be automatically separated from the control disc and is removable from the bearing shaft together with the rotation body.

10. The filter device according to claim 1, wherein the housing is a sealed housing, and the housing includes a housing opening provided on an axial side facing away from the bearing shaft and closable by a removable housing lid and through which the rotation body can be removed from the housing in axial direction of the rotation axis.

11. The filter device according to claim 1, wherein the respective filter cell includes a filter pocket on the side of the filter structure outlet side, which is formed in the outer circumference of the rotation body and which tapers towards the corresponding connection channel.

12. The filter device according to claim 1, wherein at least one of the following:

the connection channel of the respective filter cell includes a first channel portion, which extends from the filter structure outlet side perpendicularly to the rotation axis, and a second channel portion, which extends from the first channel portion to the outlet opening parallel to the rotation axis, and the connection channel of the respective filter cell extends from the filter structure outlet side to its outlet opening in an angle to both the rotation axis as well as to the perpendicular thereof.

13. The filter device according to claim 1, wherein the bearing shaft is a rotatably driven rotary shaft to which the rotation body is non-rotatably coupled.

14. The filter device according to claim 1, wherein the rotation body is coupled to the end of the bearing shaft by at least one of a quick fastener plug-in coupling and a quick fastener screw coupling.

15. A filter device for filtering out of a solid substance from a solid-liquid-mixture, the filter device comprising:

a bearing shaft which extends along a rotation axis;

a rotation body which is detachably attached to the bearing shaft and which is supported by the bearing shaft to be rotatable about the rotation axis;

at least one filter cell is formed on the rotation body and includes:

a filter structure attached to the rotation body for filtering out the solid substance from the solid-liquid-mixture, allowing the liquid of the solid-liquid-mixture to pass there through from a filter structure inlet side to a filter structure outlet side, and a connection channel which is formed in the rotation body and extends from the filter structure outlet side to an outlet opening which is formed on an axial side of the rotation body in a radial distance to the rotation axis;

a control device having a structural control unit for providing a connection between the respective outlet opening and a plurality of lines in a controlled manner, wherein the structural control unit includes a sealing disc provided to be co-rotatable with the rotation body and in which a through opening is formed corresponding to the respective outlet opening, and a stationary control disc which is in a fluidly sealed slide rotational engagement with the sealing disc and in which control openings are formed, which are connected to a respective line and which are connected to the respective through opening of the sealing disc in dependence on the rotation position of the rotation body in order to connect the filter structure outlet side of the respective filter cell with the respective line in dependence on the rotation position of the rotation body, and a housing having a housing interior accommodating the rotation body, wherein the structural control unit is arranged in the housing between an axial wall, which axially defines the housing interior and extends transversely to the rotation axis, and the rotation body, and wherein the connection channel is a first connection channel and the respective filter cell includes the first connection channel and a second connection channel formed in the rotation body, which respectively extend from the filter structure outlet side to a first and a second, respectively, outlet opening, which are formed on an axial side, facing the bearing shaft, of the rotation body in a radial distance to the rotation axis, wherein the first and the second outlet opening are arranged with respect to the rotation axis in a radial distance to both the rotation axis and each other, wherein they do no overlap in radial direction.

16. A filter device for filtering out of solid substance from a solid-liquid-mixture, the filter device comprising:

a bearing shaft which extends along a rotation axis;

a rotation body which is detachably attached to the bearing shaft and which is supported by the bearing shaft to be rotatable about the rotation axis;

at least one filter cell is respectively formed on the rotation body and includes:

a filter structure attached to the rotation body for filtering out the solid substance from the solid-liquid-mixture, allowing the liquid of the solid-liquid-mixture to pass therethrough from a filter structure inlet side to a filter structure outlet side, and a connection channel which is formed in the rotation body and extends from the filter structure outlet side to an outlet opening which is formed on an axial side of the rotation body in a radial distance to the rotation axis;

a control device having a structural control unit for providing a connection between the respective outlet opening and a plurality of lines in a controlled manner, wherein the structural control unit includes a sealing disc provided to be co-rotatable with the rotation body and in which a through opening is formed corresponding to the respective outlet opening, and a stationary control disc which is in a fluidly sealed slide rotational engagement with the sealing disc and in which control openings are formed, which are connected to a respective line and which are connected to the respective through opening of the sealing disc in dependence on the rotation position of the rotation body in order to connect the filter structure outlet side of the respective filter cell with the respective line in dependence on the rotation position of the rotation body, and a housing having a housing interior completely enclosing the rotation body, wherein the housing includes a lower housing portion which defines an accommodating chamber for accommodating the solid-liquid-mixture, wherein the accommodation chamber and the housing interior form a chamber unit defined by the same housing wall, and wherein the connection channel is a first connection channel and the respective filter cell includes the first connection channel and a second connection channel formed in the rotation body, which respectively extend from the filter structure outlet side to a first and a second, respectively, outlet opening, which are formed on an axial side, facing the bearing shaft, of the rotation body in a radial distance to the rotation axis, wherein the first and the second outlet opening are arranged with respect to the rotation axis in a radial distance to both the rotation axis and each other, wherein they do no overlap in radial direction.

17. The filter device according to claim 16, wherein at least one of the control disc and the sealing disc are formed as an interchangeable part separate from the housing.

18. The filter device according to claim 16, wherein the rotation body and the sealing disc are arranged to be dismountable such that, when removing the rotation body from the bearing shaft, the sealing disc will be automatically separated from the control disc and is removable from the bearing shaft together with the rotation body.

19. The filter device according to claim 16, wherein the housing is a sealed housing, and the housing includes a housing opening provided on an axial side facing away from the bearing shaft and closable by a removable housing lid and through which the rotation body can be removed from the housing in axial direction of the rotation axis.

20. The filter device according to claim 16, wherein the respective filter cell includes a filter pocket on the side of the filter structure outlet side, which is formed in the outer circumference of the rotation body and which tapers towards the corresponding connection channel.

21. The filter device according to claim 16, wherein at least one of the following:

the connection channel of the respective filter cell includes a first channel portion, which extends from the filter structure outlet side perpendicularly to the rotation axis, and a second channel portion, which extends from the first channel portion to the outlet opening parallel to the rotation axis, and the connection channel of the respective filter cell extends from the filter structure outlet side to its outlet opening in an angle to both the rotation axis as well as to the perpendicular thereof.

22. The filter device according to claim 16, wherein the bearing shaft is a rotatably driven rotary shaft to which the rotation body is non-rotatably coupled.

23. The filter device according to claim 16, wherein the rotation body is coupled to the end of the bearing shaft by at least one of a quick fastener plug-in coupling and a quick fastener screw coupling.

* * * * *